United States Patent [19]
Kataoka et al.

[11] 3,818,893
[45] June 25, 1974

[54] SUBMERGED COMBUSTION TYPE VAPORIZER

[76] Inventors: Yasuo Kataoka, No. 45 Daina Taihei Building 11-20, Kohroen, Settsu, Osaka; Morio Shimizu, 176 1-chome, Kitazona, Hyogo, Itami; Tomoo Watanabe, 3-27-1, Tokiwacho, Naku-ku, Kanagawa, Yokohama, all of Japan

[22] Filed: Aug. 7, 1973

[21] Appl. No.: 386,349

[52] U.S. Cl. .................. 126/360 A, 126/360 R
[51] Int. Cl. ............................................. F24h 1/20
[58] Field of Search .................. 126/360 R, 360 A

[56] References Cited
FOREIGN PATENTS OR APPLICATIONS
1,171,169  11/1969  Great Britain ................. 126/360 R

*Primary Examiner*—William F. O'Dea
*Assistant Examiner*—William C. Anderson

[57] ABSTRACT

In this invention, many through holes are made on the inside surfaces opposed to a heat exchanging means of sparge boxes arranged on both sides of said heat exchanging means so that a necessary and sufficient quantity of heat transmitted to a fluid passing through tubes for exchanging heat of said heat exchanging means may be guaranteed and it may be possible to feed an optimum heat energy.

4 Claims, 3 Drawing Figures

PATENTED JUN 25 1974  3,818,893

SUBMERGED COMBUSTION TYPE VAPORIZER

This invention relates to a submerged hot gas heat exchanger for gasifying such very low temperature process fluid as a liquefied natural gas at a high thermal efficiency.

A conventional heat exchanger of this kind has such structure that a hot gas from a burner is introduced below a heat exchanging part located in the center of a tank and is jetted into a liquid through holes made in the lower part of its a shroud. According to such structure, there is such defect that, through a favorable contact with an eddy current heat exchanging liquid of a high energy produced by the hot gas is obtained in the heat exchanging tube near the hole, farther upward from the hole, the heat will be taken by the very low temperature fluid in the tube, therefore the energy of the eddy current heat exchanging liquid will reduce and the quantity of heat transmitted to the tube above the heat exchanging part will be short.

An object of the present invention is to provide a submerged hot gas heat exchanger in the high heat exchanging rate by eliminating the above mentioned defect. The present invention is characterized in that many gas jetting holes of diameters reduced gradually so as to be largest at the lower end and smallest at the upper end are made on the inside surfaces opposed to a heat exchanging part of sparge boxes arranged on both sides of said heat exchanging part.

Figure 1:
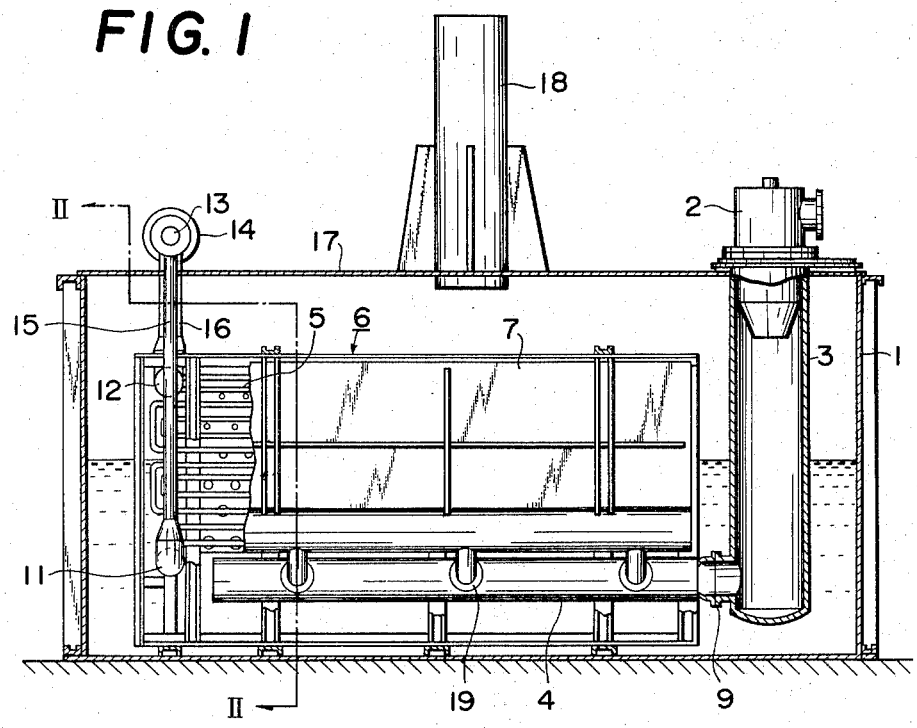
FIG. 1 is a vertically sectioned elevation of an entire embodiment of the present invention as partly sectioned to show the details within it.
Figure 2:
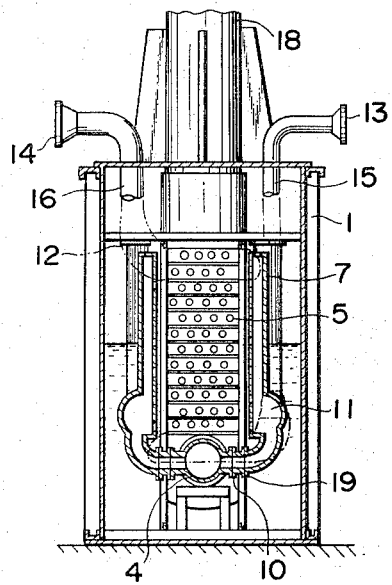
FIG. 2 is a cross-sectioned view on line II—II in FIG. 1.
Figure 3:
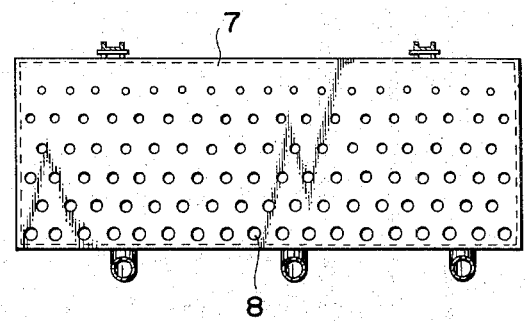
FIG. 3 is an elevation of a spare box according to the present invention.

In FIGS. 1 and 2, a tank 1 keeps such liquid for exchanging heat as, for example, water within it, is sealed in the upper part with a lid plate 17 and is fitted with an exhaust pipe 18 in the center of the lid plate. 2 is a burner provided at one upper end of the tank 1 and having a high temperature combustion gas jetting port opened as directed downward. 3 is a combustion gas cylinder for leading the combustion gas downward into water, connected at the upper end with the burner 2 and having a flange 9 for connecting a combustion gas conduit pipe on the side at the lower end. 4 is a horizontally mounted combustion gas conduit pipe connected at one end with the combustion gas cylinder flange and having several flanges 10 for connecting sparge boxes on both side surfaces. 5 is a tube for exchanging heat bent parallelly and snakily and welded at both ends to header tanks. A process fluid is to pass through said tubes 5, 6 is a heat exchanging part formed of a plurality of snaky tubes 5, a fluid inlet header tank 11 and a gas outlet header tank 12. 7 is a sparge box of a thin box structure positioned in parallel with each side surface in the lengthwise direction of the heat exchanging part 6, provided with many through holes 8 for jetting gases of diameters reduced gradually upward so as to be largest at the lower end and smallest at the upper end on the inside surface opposed to the tubes for exchanging heat and having flanges 19 for connecting the combustion gas conduit pipe. 13 and 14 are inlet and outlet flange, respectively. 15 is a pipe for introducing process fluid. 16 is a gas delivering pipe.

The apparatus according to the present invention consists of the above mentioned structure so that a combustion gas generated in the burner 2 may pass through the combustion gas cylinder 3, combustion gas conduit pipe 4 and flanges 10 and 19 and may be jetted at a high velocity into water through the through holes 8 of the sparge boxes 7. The combustion gas and water for exchanging heat, while mixing, transmit the heat energy of the combustion gas to the water, violently flow upward by the principle of an air lift, quickly pass between the respective tubes, at the same time, transmit the heat energy of the water to the process fluid flowing through the tubes 5, overflow out of the heat exchanging part 6, flow down, are then again heated by the combustion gas below the heat exchanging part and circulate within the tank 1.

By the way, the combustion gas separates from the water in the upper part of the tank and is discharged out through the exhaust pipe 18. On the other hand, the process fluid to be gasified flows into the tubes 5 through the inlet flange 13, introducing pipe 15 and inlet header tank 11. The process fluid within the tubes 5 receives evaporation heat from the eddy current heat exchanging water rising outside the tubes while snaking from the lower ends of the tubes, gradually begins to gasify and becomes a gas at a proper temperature at the upper ends of the tubes and the gas is sent out through the outlet header tank 12, gas delivering pipe 16 and outlet flange 14.

In the present invention, as mentioned above, the combustion gas is jetted into the liquid through the through holes 8 having diameters made smaller upward so as to be largest at the lower end of the sparge box 7 provided as opposed to both side surfaces of the heat exchanging part 6.

Therefore, the eddy current heat exchanging water can also retain the required heat energy until it passes between the tubes at the upper ends, because the heat energy taken by the fluid within the tubes is supplemented by the combustion gas always jetting out of the sparge boxes on both sides.

Further, it is so easy to design and modify the diameters, number and arrangement of the gas jetting holes of the sparge box that it is possible to feed an optimum heat energy irrespective of the evaporating capacity and the size of the heat exchanger.

What is claimed is:

1. A submerged hot gas heat exchanger comprising a tank keeping a liquid for exchanging heat within it, a burner provided in the upper part of the tank, a combustion gas cylinder connected with said burner and extended downward within the tank, horizontally mounted combustion gas conduit pipe connected to the side at the lower end of said combustion gas cylinder, a heat exchanging means positioned above the said combustion gas conduit pipe and a pair of sparge boxes provided as parallelly opposed to both side surfaces in the lengthwise direction of said heat exchanging means, provided with many through holes for jetting gases on the entire inside surfaces opposed to the tubes of the above mentioned heat exchanging means and connected in the bottom part with the above mentioned combustion gas conduit pipe.

2. A heat exchanger according to claim 1 wherein the diameters of the through holes made in said pair of sparge boxes are reduced gradually upward so as to be largest at the lower end and smallest at the upper end of said sparge box.

3. A heat exchanger according to claim 1 wherein said heat exchanging means consists of a plurality of parallelly and snakily bent tubes for exchanging heat through which a process fluid is to pass and an inlet header tank and outlet header tank connected to both ends of said tubes.

4. A heat exchanger according to claim 2 wherein said through holes are made in many rows extending in the lengthwise direction of the sparge box and are arranged zigzag in the adjacent rows.

* * * * *